United States Patent [19]

Garber et al.

[11] Patent Number: 4,576,117
[45] Date of Patent: Mar. 18, 1986

[54] LIVESTOCK FEEDING APPARATUS

[75] Inventors: Gary L. Garber, Metamora; Marcus N. Allhands, Sycamore, both of Ill.

[73] Assignee: A. O. Smith Harvestore Products, Inc., Arlington Heights, Ill.

[21] Appl. No.: 624,451

[22] Filed: Jun. 25, 1984

[51] Int. Cl.$^4$ .......................... A01K 5/00; B65G 47/46
[52] U.S. Cl. ..................................... 119/52 B; 198/364
[58] Field of Search .................... 119/52 B, 52 AF; 198/364, 496

[56] References Cited

U.S. PATENT DOCUMENTS

| | | | |
|---|---|---|---|
| 3,437,192 | 4/1969 | Cauffman | 119/52 B X |
| 3,672,334 | 6/1972 | Scheppele | 119/52 B |
| 4,320,825 | 3/1982 | Buschbom et al. | 119/52 B X |

Primary Examiner—Hugh R. Chamblee
Attorney, Agent, or Firm—Andrus, Sceales, Starke & Sawall

[57] ABSTRACT

A livestock feeding apparatus which includes an endless belt conveyor. Feed is supplied to the upper run of the belt and is selectively discharged from either side of the conveyor belt by a feed discharge unit. The feed discharge unit includes a frame mounted to travel in a reciprocating path above the belt and the frame carries a feed diverting plow and a rotatable brush. The plow and brush are disposed in generally parallel arrangement and can be pivoted between a first diagonal position with respect to the side edge of the belt to a second diagonal position. Movement of the conveyor belt is transmitted through a drive mechanism to rotate the brush about its axis. As the feed discharge unit moves relative to the belt, feed is discharged from the side edge of the moving belt by the plow and the brush acts to remove residual feed from behind the plow. When it is desired to feed from the opposite side of the belt, the feed discharge unit is moved to the feed end of the conveyor and as it reaches its end point in its reciprocating travel and is reversed a shifting mechanism is actuated to pivot the plow and brush so that continued relative movement between the feed distributing unit and the conveyor will cause the feed to be distributed to the opposite side of the belt.

16 Claims, 9 Drawing Figures

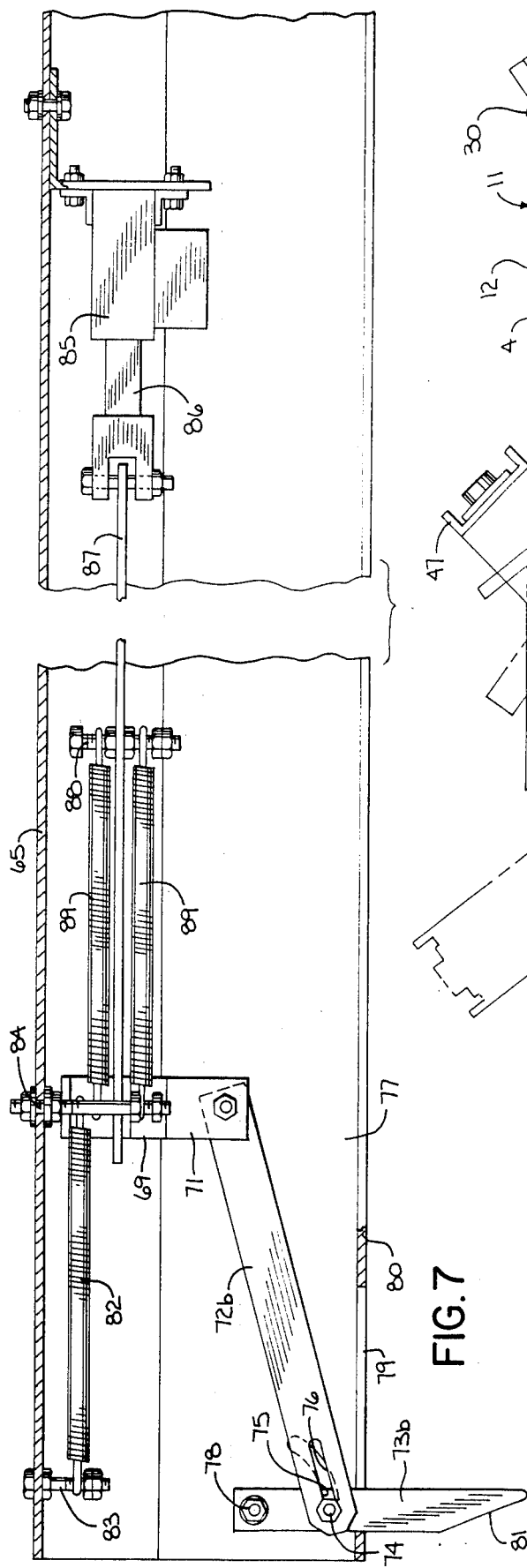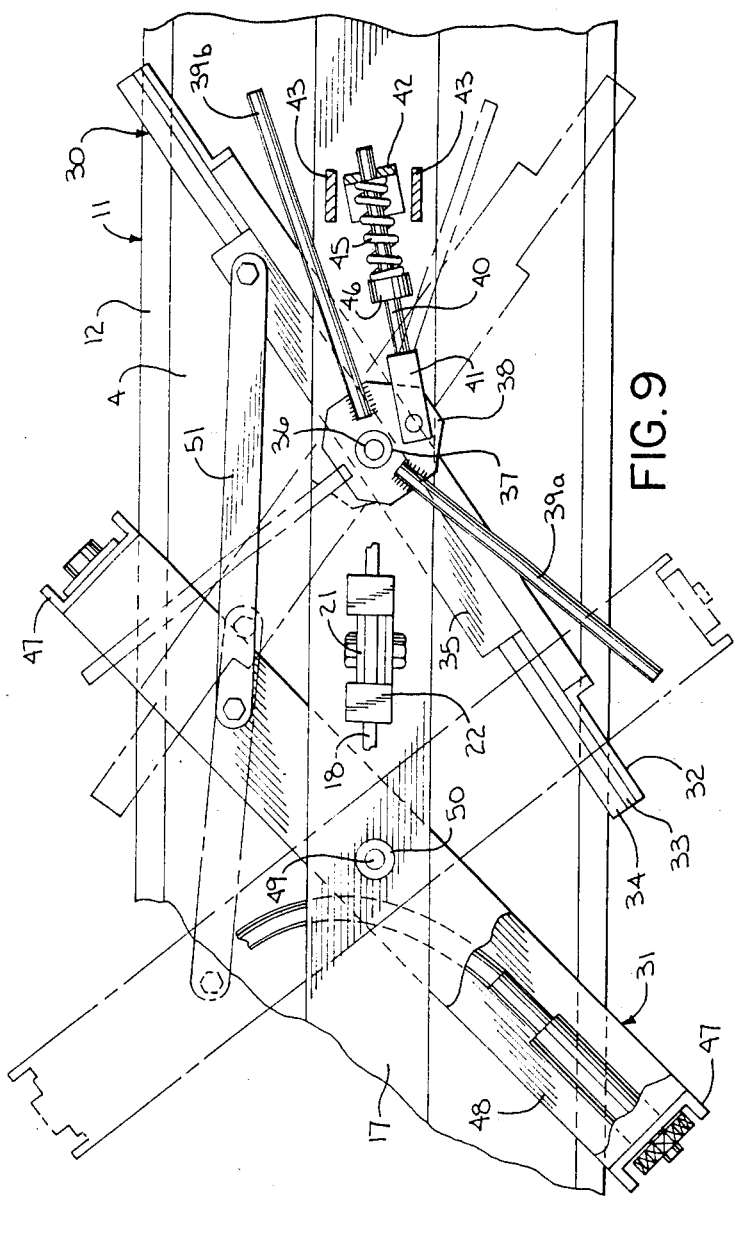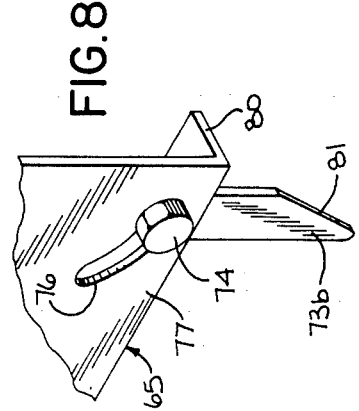

LIVESTOCK FEEDING APPARATUS

BACKGROUND OF THE INVENTION

Livestock feeding systems frequently use endless belt conveyors to deliver feed to a feed area. In some installations the conveyor may extend several hundred feet through a stantion barn or other livestock feeding area and the conveyors are designed to selectively discharge feed from one side of the conveyor or the other. In a conveying system of this type, a large rotary brush rotates about a vertical axis while moving in a reciprocating path along the length of the moving conveyor to discharge feed from a side of the conveyor. By reversing rotation of the brush, the feed can be distributed to the opposite side of the conveyor. However, because the feed is brushed from the conveyor with substantial force, conveyors of this type require side baffles, spaced from the side edge of the conveyor, to prevent the feed from being thrown too far from the conveyor.

Other belt type conveyors have employed a feed diverter or plow which is disposed diagonally to the side edges of the conveyor and moves in a reciprocating path along the length of the moving conveyor. In certain installations the plow can be pivoted approximately 90° to a second diagonal position to thereby discharge feed from the opposite side of the conveyor. However, due to irregularities in the belt and in the wiping edge of the plow, the fines in the feed, which include minerals, vitamins, and other additives are not completely removed from the belt, thereby resulting in the fines being carried to the end of the belt and not being uniformly mixed with the feed delivered to the livestock.

SUMMARY OF THE INVENTION

The invention is directed to an improved livestock feed conveyor that provides a more effective discharge of feed and maintains the homogenous condition of the feed. More specifically, a feed distributing unit is mounted to travel in a reciprocating path above the upper run of the conveyor belt, and the unit carries a feed diverter or plow, as well as a rotatable brush which is mounted in spaced parallel relation to the plow. Both the plow and the brush can be pivoted between a first diagonal position, in which the plow and brush are located at an acute angle to the side edge of the conveyor belt, to a second diagonal position, to thereby selectively discharge the feed from opposite sides of the conveyor belt as the feed distributing unit moves in its reciprocating path relative to the belt.

The plow, which rides against the upper surface of the belt, serves to deflect the major portion of the feed from the side edge of the conveyor, and the rotary brush trailing behind the plow, acts to brush any remaining fines from the conveyor. This insures that all of the fines, which includes the minerals, vitamins and other supplements in the feed, will be maintained in uniform distribution throughout the feed as it is delivered to the livestock.

The invention includes a novel mechanism for changing the direction of feed from one side of the conveyor to the other. When it is desired to change the direction of feed, the feed distributing unit is moved to the feed end of the conveyor and as the unit reaches the end point in its reciprocating travel and is reversed, a shifting mechanism is actuated to pivot the plow and brush to the second diagonal position so that on continued movement of the feed distributing unit, the plow and brush will then act to discharge the feed from the opposite side of the conveyor belt.

With the shifting mechanism of the invention, the plow and brush are pivoted at a position immediately after the reversal of direction of travel of the unit, when the plow is not under load, and this insures a more reliable shifting of the plow and brush.

As substantially all of the feed is diverted by the plow and the remaining fines are gently brushed from the belt by the rotating brush, it is not necessary to employ side baffles or side plates to retain or control the discharge of feed from the conveyor. As side baffles are not required, the overall cost of the conveying system is substantially reduced.

Other objects and advantages will appear in the course of the following description.

DESCRIPTION OF THE DRAWINGS

The drawings illustrate the best mode presently contemplated of carrying out the invention.

In the drawings:

FIG. 7 is an enlarged vertical section showing the mechanism for pivoting the plow and brush;

FIG. 8 is a perspective view of a latching dog; and

FIG. 9 is an enlarged fragmentary plan view of the plow and brush unit.

DESCRIPTION OF THE ILLUSTRATED EMBODIMENT

Figure 1:
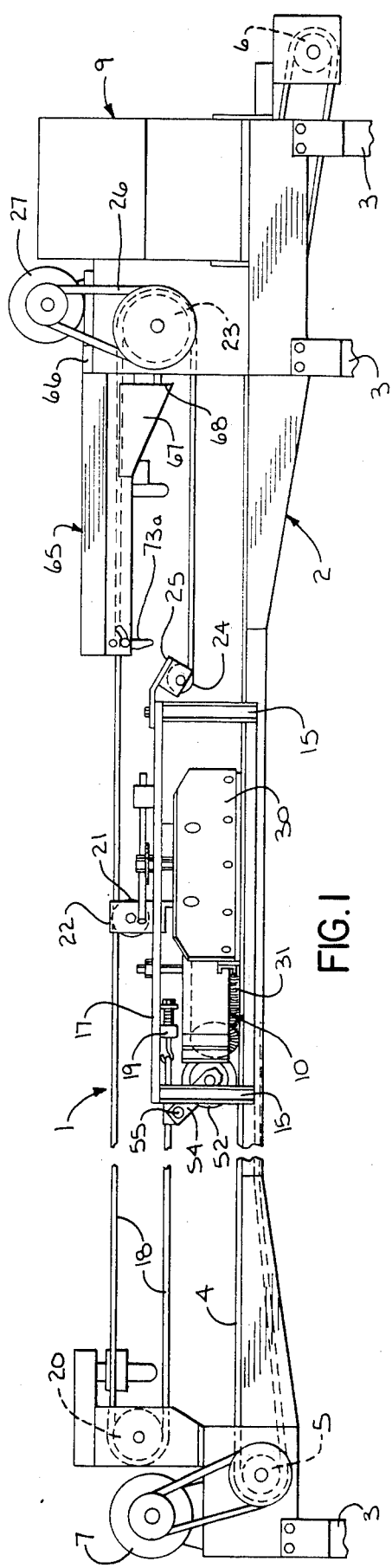
FIG. 1 is a side elevation of the conveyor system of the invention.

The drawings illustrate a feed conveyor 1 composed of a frame or supporting structure 2 that is supported above a foundation by a series of legs 3.

Conveyor 1 includes an endless belt 4 which is trained over a drive roll 5 and idler roll 6, both of which are journaled in frame 2. A drive unit 7, which can be an electric or hydraulic motor, is operably connected through a conventional belt drive to drive roll 5 to move the belt 4 in an endless path of travel.

Frame 2 includes an inverted U-shaped supporting pan 8 and the upper conveying run of belt 4 is supported on pan 8.

Feed, or other material to be conveyed, is supplied to one end of the belt 4 through a conventional hopper 9 which is mounted on the end of frame 2.

Figure 3:
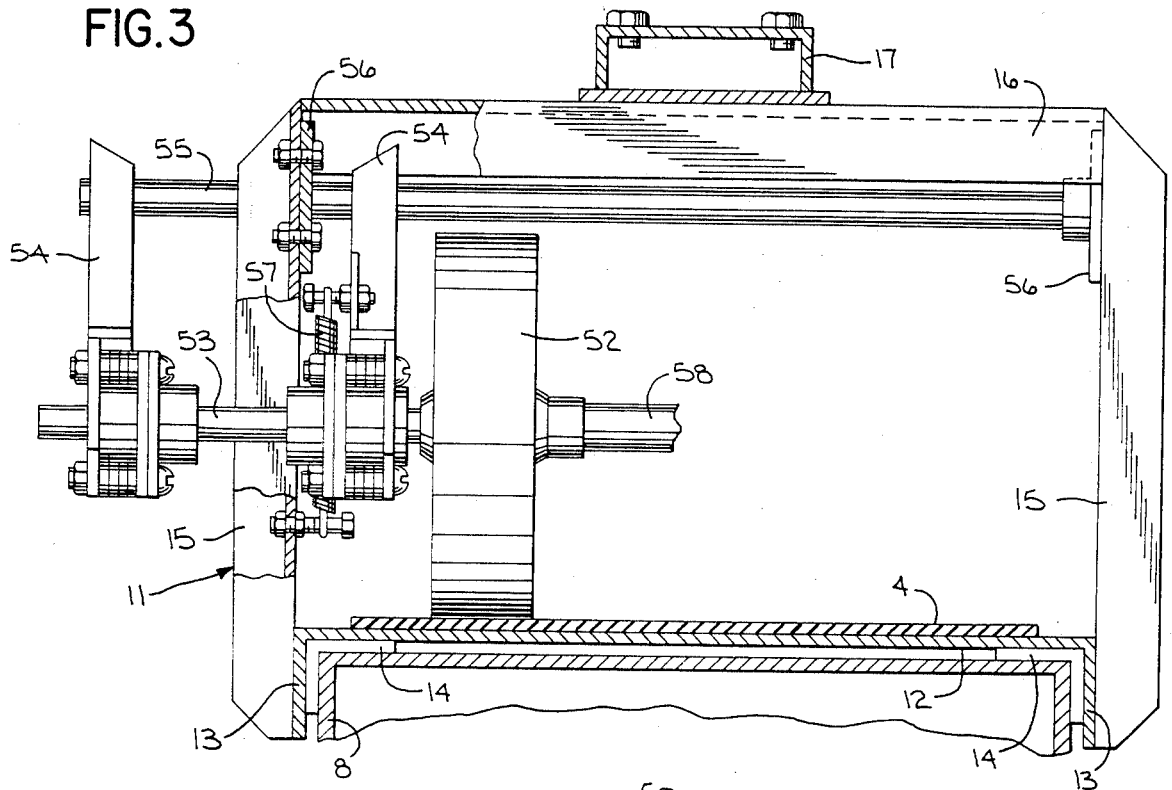
FIG. 3 is a section taken along line 3—3 of FIG. 2.
Figure 4:
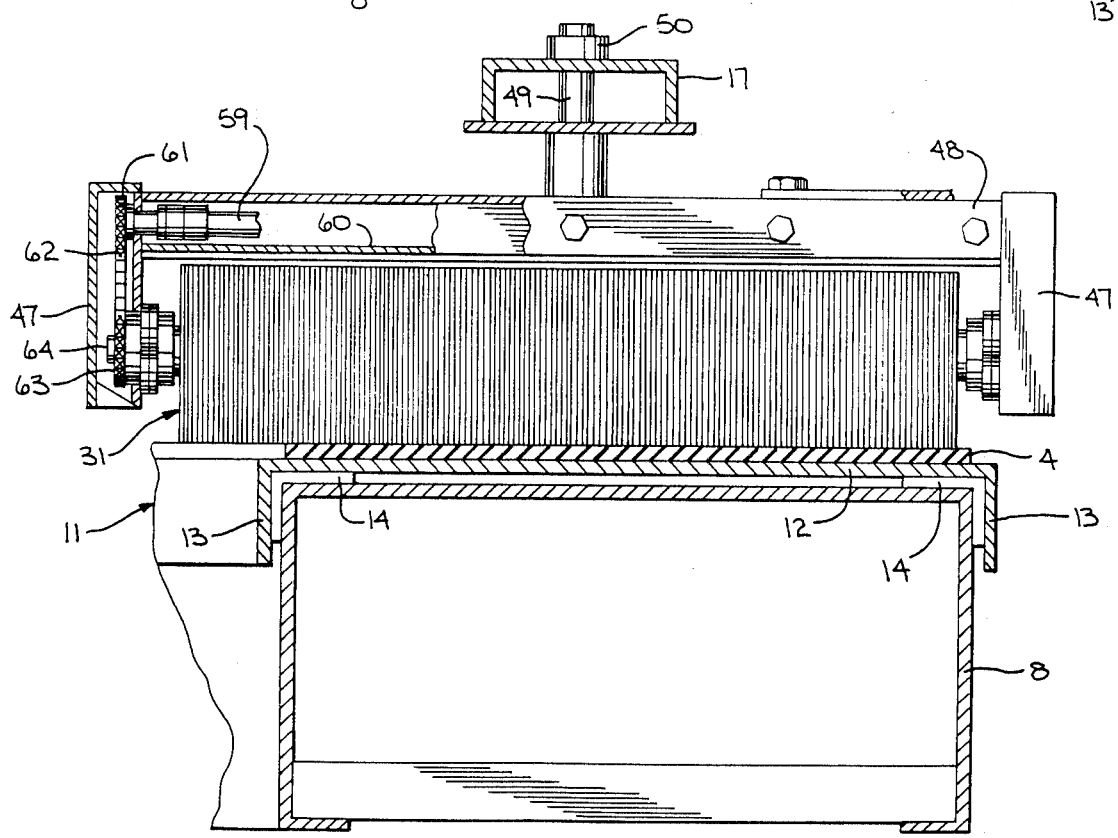
FIG. 4 is a section taken along line 4—4 of FIG. 2.
Figure 5:
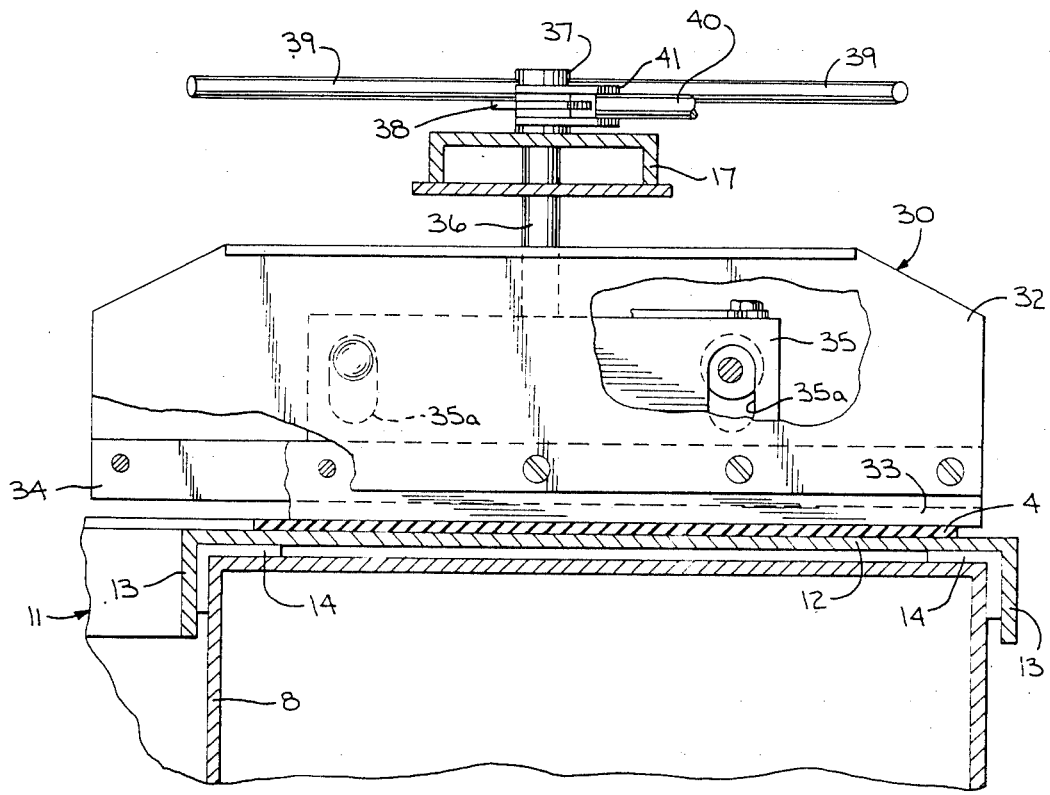
FIG. 5 is a section taken along line 5—5 of FIG. 2.

In accordance with the invention, a feed distributing unit 10 is mounted to move in a reciprocating path along the length of conveyor 1 and operates to selectively discharge the feed on belt 4 to either side of the belt to a feed area. Feed distributing unit 10 includes a frame 11 composed of a bottom pan 12 or base that supports the upper run of belt 4 and has a pair of downwardly extending side flanges 13 which straddle pan 8 of conveyor frame 2. As shown in FIGS. 3-5, plastic angle-shaped wear blocks 14 are mounted on the inner surface of flanges 13 and serve to ride on the pan 8 as the feed distributing unit 10 is moved relative to the conveyor.

Located at each end of frame 11 is a pair of uprights 15 that extend upwardly from pan 12 and the upper ends of corresponding pairs of uprights 15 are connected together by cross members 16. A longitudinal beam 17 extends between cross members 16 and is positioned centrally above the conveyor belt 4.

To move the feed distributing unit 10 in a reciprocating path, a cable 18 is spring mounted to a block 19 secured to the undersurface of beam 17 as shown in FIG. 1. Cable 18 extends over pulley 20, then passes over a pulley 21 mounted on bracket 22 attached to beam 17, then passess around a pulley 23 mounted on frame 2 and is finally connected to a winch 24 mounted through bracket 25 to frame 11 as illustrated in FIG. 1. Operation of winch 24 will tension the cable 18, as desired. Pulley 23 is connected by belt drive 26 to motor 27 which is mounted on frame 2.

With this cable drive, operation of the reversible motor 27 will move the feed distributing unit 10 along the length of the conveyor. The reversible motor enables the feed distributing unit 10 to be moved in a reciprocating path over short lengths of the conveyor, or alternately to be reciprocated throughout the entire length of the conveyor, as desired. However, in some installations, it is contemplated that a non-reversing motor may be employed, in which case the feed distributing unit will reciprocate in a fixed path from one end of the conveyor to the other.

Figure 2:
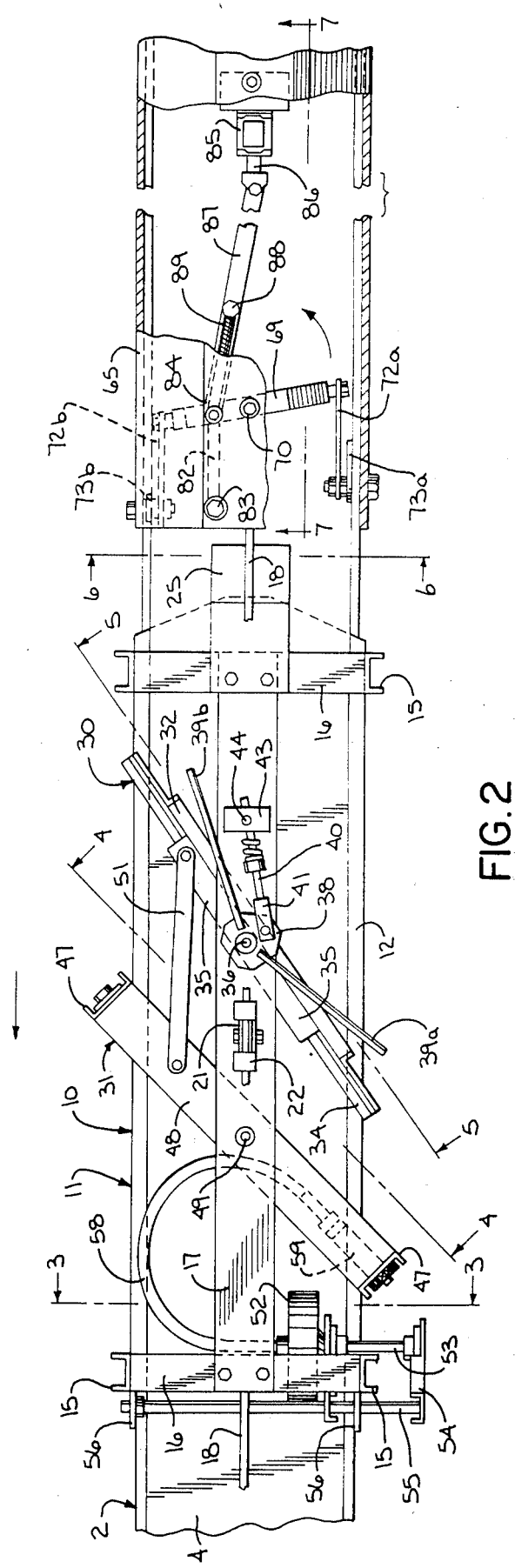
FIG. 2 is a top plan view of the conveyor system shown in FIG. 1 with parts broken away.

In accordance with the invention, the feed distributing unit 10 carries a plow 30 and a brush 31 in generally parallel arrangement. Both the plow and the brush are disposed diagonally at an acute angle to the side edge of the conveyor belt 4, as best illustrated in FIGS. 2 and 9. Plow 30 is composed of a generally vertical plate 32 which carries a flexible wiper blade 33 formed of a plastic material such as polyurethane. Wiper blade 33 is supported from the lower edge of plate 32 by a channel-shaped backing plate 34. In operation, the wiper blade is adapted to ride along the surface of the upper run of conveyor belt 4 as shown in FIG. 5. Plate 32 is mounted from channel 35 by a pair of bolts that extend through slots 35a in the channel. The slotted connection permits the plow 30 to float under its own weight on the belt to maintain proper contact with the belt and provide good scraping characteristics.

A channel shaped plate 35 is attached to the rear of plate 32 and a a pivot shaft 36 extends upwardly from the central portion of plate 35 and is journaled within a bearing 37 mounted on the upper surface of longitudinal beam 17 as shown in FIG. 5. This construction enables the plow 30 to be pivoted about the axis of shaft 36.

The upper end of shaft 36 carries a shift plate 38 and a pair of arms 39 extend outwardly from the shift plate and tripping of the arms, as will be hereinafter described, acts to pivot the plow 30 about shaft 36.

As best illustrated in FIG. 9, rod 40 is connected to the edge of shift plate 38 by clevis 41, and the outer end of rod 40 is connected to a generally U-shaped spring seat 42, which is pivoted to a channel-shaped bracket 43 and to beam 17 through pivot 44. A compression spring 45 is mounted on rod 40 and is seated between spring seat 42 and collar 46 secured to rod 40. The force of spring 45 acts in a direction toward the pivot shaft 36 so that when one of the arms 39 is tripped, and the shift plate 38 is rotated, the spring 45 will urge the plate 38 to the full over—center position.

Brush 31 is journaled for rotation about its axis between a pair of end members 47 which are connected together by a top channel 48. A vertical shaft 49 projects upwardly from top channel 48 and is journaled within a bearing 50 mounted on longitudinal beam 17. A connecting arm 51, as shown in FIG. 9, connects the support plate 35 of plow 30 with the top channel 48 of brush 31 so that pivotal movement of plow 30 will be transmitted to correspondingly pivot the brush 31 about the axis of shaft 49.

Plow 30 and brush 31 are adapted to be pivoted from a first diagonal position, as shown by the solid lines in FIG. 9, to a second diagonal position relative to belt 4, as shown by the phantom lines in FIG. 9. In the first diagonal position, the plow extends at an angle of about 55° with respect to a line transverse to the side edge of the belt while the brush extends at an angle of about 45° with respect to this line. Both the plow and the brush are in the same angular relationship when in the second diagonal position as shown by the phantom lines in FIG. 9.

Movement of the feed distributing unit relative to the conveyor will cause the plow to divert the feed from side edge of the belt, and any fines, which may include vitamins, minerals, and other supplements, which escape beneath the wiper blade 33 will be brushed from the conveyor by rotation of the brush 31.

To rotate the brush 31 about its axis, a drive wheel 52, as shown in FIGS. 2 and 3, is mounted on horizontal shaft 53 which is journaled in the lower ends of a pair of downwardly extending arms 54 which are mounted on shaft 55. Shaft 55, in turn, is pivoted to a pair of lugs 56 which are connected to uprights 15. With this construction, the drive wheel 52 can be pivoted in a vertical plane and will ride on the upper surface of belt 4.

To urge the drive wheel 52 into engagement with the belt 4, a spring 57 is connected between one of the arms 54 and frame 11 as illustrated in FIG. 3. The force of the spring 57 will urge the drive wheel 52 into firm contct with the conveyor belt.

Drive wheel 52 is connected by a flexible drive shaft 58 to a shaft 59 which is journaled within one of the end channels 47. As shown in FIG. 4, the drive shaft 58 extends within an angle shaped guide channel 60 which is mounted to the undersurface of the top channel 48. As illustrated in FIG. 4, shaft 59 carries a sprocket 61 which is conncted by chain 62 to a sprocket 63 on shaft 64 of brush 31. As drive wheel 52 rides on belt 4, it will be rotated, and the rotation of drive wheel 52 is transmitted through the flexible drive shaft 58 and the chain drive 62 to the shaft 64 of brush 31 to thereby rotate the brush about its axis.

Brush 31 is formed with relatively long flexible bristles which will provide a gentle brushing or wiping action to discharge any residual fines which have escaped the plow 31 from the edge of the belt 4.

To automatically pivot the plow 30 and brush 31, a shifting mechanism is mounted on a hood 65 that extends outwardly from frame 2 over the belt 4. As shown in FIG. 1, the rear edge hood 65 is provided with a generally horizontal flap 66 which is secured to the frame 2. Hood 65 also includes a pair of generally triangular side plates 67 which are connected to frame 2 by a threaded adjusting mechanism indicated generally by 68. The adjusting mechanism permits the hood 65 to be pivoted in a vertical plane to properly position the shifting mechanism carried by the hood.

Figure 6:
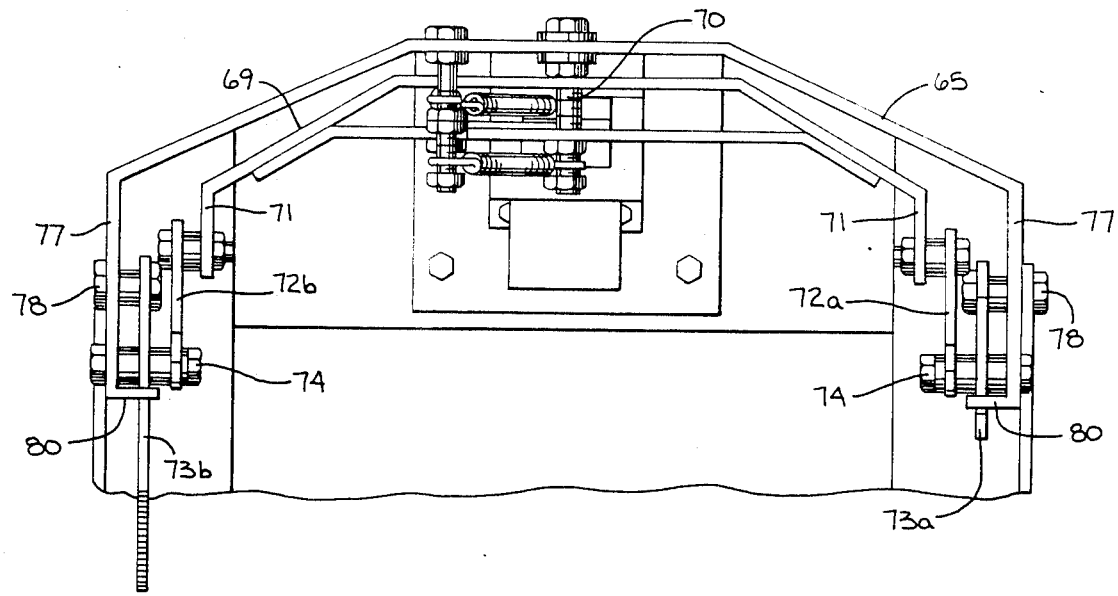
FIG. 6 is a section taken along line 6—6 of FIG. 2.

As shown in FIGS. 6–8, the shifting mechanism also includes an arch 69 which is pivoted for horizontal swinging movement relative to hood 65 by vertical pivot 70. Arch 69 is provided with a pair of downwardly extending end flanges 71, each of which is connected to the end of a generally horizontal arm 72, while the opposite end of each arm 72 is pivotally connected to the central portion of a downwardly extending dog 73. To provide the pivotal connection, a bolt 74 extends through an opening in dog 73 and through an elongated slot 75 in arm 72. In addition, bolt 74 extends through a curved slot 76 formed in the side wall 77 of hood 65.

As shown in FIG. 7, the upper end of each dog 73 is pivoted to the respective side wall 77 at pivot 78, while the lower portion of each dog 73 projects through an elongated slot 79 formed in the inwardly extending horizontal flange 80 of hood 65. The lower end of each dog 73 is provided with a diagonal edge 81 which is adapted to be engaged by the shifting arm 39, as the feed distributing unit 10 approaches the hood.

In operation, only one of the dogs 73 will be in a downwardly extending operative position to be engaged by the respective shifting arm 39, while the other of the dogs 73 will be in a rearwarldy pivoted, inoperative position. To provide this action, in which one dog 73 is up and the other one is down, the arch 69 is pivoted to move in a horizontal plane. In this regard, spring 82 is connected between a stud 83 on hood 65 and a stud 84 on arch 69 at a location offset from the pivot 70 of the arch. The force of spring 82 will tend to pivot the arch 69 around the pivot 70 in the direction of the arrow as shown in FIG. 2. This biasing action of spring 82 will tend to draw the arm 72a rearwardly and correspondingly pivot the dog 73a upwardly about its pivot 78 to the inoperative position as illustrated in FIG. 6. The force of spring 82 will urge the opposite end of arch 69 forwardly so that dog 73b will be in the downwardly hanging, operative position.

Arch 69 can be pivoted against the force of spring 82 by a solenoid 85 which is mounted on the underside of hood 65. The plunger 86 of solenoid 85 is connected to one end of a bar 87 which is mounted for sliding movement on the underside of hood 65. Bar 87 carries a bolt 88 and a pair of springs 89 are located on either side of bar 87 and connect bolt 88 with bolt 84 mounted on arch 69. Thus, actuation of the solenoid will operate in opposition to the force of spring 82 to pivot the arch 69 in the opposite direction and thereby pivot dog 73b to the upper inoperative position and return dog 73a to the downwardly hanging operative positon.

The solenoid 85 operating through springs 89 insures that the dog 73b will be engaged with the end of the slot 78 when dog 73b is in its inoperative position, to thereby prevent vibration of the dog relative to the hood and to insure that the dog is pivoted upwardly to a position where it will not interfere with the arm 39 on the feed distributing unit.

In operation, feed is supplied to the conveyor belt 4 through hopper 9, and through operation of the drive motor 27 the feed distributing unit 10 can be moved along the length of the conveyor belt in a reciprocating path of travel to discharge the feed from one of the side edges of the belt. The belt 4 operates in only one direction and moves at a considerably faster speed of travel than the speed of the feed distributing unit 10, with the result that the plow 30, will act to divert feed from the side edge of the belt when moving in both directions in its reciprocating path of travel. Brush 31, as previously described, acts to brush any fines from the belt which may have escaped the plow 30.

During this reciprocating travel one of the arms, such as 39b will project outwardly beyond the edge of the feed distributing unit 10. When it is desired to discharge feed from the opposite side of the conveyor, the unit 10 is moved toward the hood 65 at the feed end of the conveyor. At this time the arch 69 is pivoted under the influence of spring 82 so that dog 73b is in the downwardly hanging operative position and the dog 73a is pivoted upwardly to the inoperative position. As unit 10 approaches the hood 65, the projecting arm 39b will engage dog 73b pivoting the dog upwardly a sufficient distance to permit the arm 39b to pass. Dog 73b will then return by gravity back to its operative position.

When the feed distributing unit 10 reaches its end point of travel, it will contact a switch, not shown, to reverse the operation of motor 27 and thereby move the unit 10 in the reverse direction. On reversal of travel of the feed distributing unit 10, the projecting arm 39b will engage the downwardly hanging dog 73b. As dog 73b cannot pivot forwardly, travel of unit 10 will then cause the arm 39b to pivot and ride by the dog 73b. Pivotal movement of arm 39b results in corresponding pivotal movement of the plow 30 and brush 31. As the unit 10 continues its travel, the plow 30 and brush 31 will then divert the feed to the opposite side of the conveyor. Pivoting movement of arm 39b will cause corresponding pivoting movement of arm 39a to a position where arm 39a then projects outwardly beyond the unit 10, as illustrated in FIG. 2.

In this mode of operation, with arm 39a being the projecting arm, it is necesary to move the dog 73a to the operative position in order to subsequently reverse the positon of the plow and brush. Thus, when it is desired to pivot the plow 30 and brush 31 back to their original position, solenoid 84 is actuated to pivot arch 69 and move dog 73a to the operative position and correspondingly pivot dog 73b to the inoperative position. When the unit 10 approaches the hood 65, the projecting arm 39a will engage the downwardly hanging dog 73a to pivot the dog upwardly and the dog 73a will then return to its operative position by gravity. Subsequently, on reversal of travel of unit 10, the projecting arm 39a will engage dog 73a, and as dog 73a cannot pivot forwardly, the arm 39a will be pivoted to thereby pivot the plow 30 and brush 31 back to their original angular condition with respect to belt 4.

With the shifting mechanism of the invention, the plow is shifted at the feed end of the conveyor, immediately after reversal of travel of the feed distributing unit 10, when the plow is not under a substantial load. This insures a more positive shifting motion for the plow and brush.

The use of the plow and brush in tandem enables that all of the feed, including fines, to be discharged from the conveyor belt and thus insures a more uniform mixing of the feed supplements with the feed.

As the action of the brush 31 is a gentle sweeping action, it is not necessary for the conveyor to include side baffles and plates to contain the feed being discharged from the side of the conveyor.

Various modes of carrying out the invention are contemplated as being within the scope of the following claims particularly pointing out and distinctly claiming the subject matter which is regarded as the invention.

We claim:

1. A livestock feed apparatus, comprising a supporting structure, an endless conveyor belt mounted to travel on said supporting structure in an upper run and a lower run, feed supply means for supplying feed to the upper run of the belt, a feed discharge unit disposed above said upper run for selectively discharging feed from either side edge of said belt, said unit including a frame, plow means carried by the frame and having a blade disposed to ride against the upper run of said belt, brush means carried by the frame and including a rotatable brush disposed generally parallel to said plow means, pivot means for pivoting said plow means and said brush means from a first diagonal position in which said blade and said brush extend diagonally to a side edge of the belt to a second position in which said blade and said brush extend at a second angle to the side edge of the belt, means responsive to movement of the belt for rotating the brush about its axis, drive means for moving said unit in a reciprocating path along the length of the conveyor, and shifting means responsive to said unit reaching a predetermined location in its reciprocating path of travel for pivoting the plow means and said brush means from the first position to the second position to thereby discharge feed from the opposite side edge of the belt.

2. The apparatus of claim 1, wherein said blade and said brush when in the first and second positions extend laterally beyond the corresponding side edge of the belt.

3. The apparatus of claim 1, wherein said drive means includes a cable connected to said frame, means to support the cable for movement on said frame, and a reversible drive member operably connected to the cable.

4. The apparatus of claim 1, wherein said shifting means is disposed adjacent said feed supply means and is operable on reversal of the direction of travel of said unit to pivot said plow means and brush means.

5. The apparatus of claim 1, wherein said brush means comprises a support, and means for journalling the brush with respect to said support, said brush including a plurality of relatively long flexible bristles.

6. The apparatus of claim 5, wherein the axis of the brush is disposed horizontally.

7. The apparatus of claim 5, and including an arm pivotally connecting said plow means with said brush means.

8. A livestock feeding apparatus, comprising a supporting structure, an endless conveyor belt mounted for travel on said supporting structure and having an upper conveying run and a lower run, feed supply means for supplying feed to one end of the upper run of the belt, a feed discharge unit disposed above said upper run for selectively discharging feed from either side edge of said belt, said unit including a frame, plow means carried by the frame and having a blade disposed to ride against the upper run of said belt, brush means carried by the frame and including a rotatable brush, said brush having its axis disposed generally horizontal and disposed generally parallel to said blade, pivot means for pivoting said plow means and said brush means from a first position whereat said blade and said brush extend diagonally at an acute angle to a side edge of the belt to a second position in which said blade and said brush extend diagonally at a second acute angle to the side edge of the belt, first drive means for moving said unit in a reciprocating path along the length of the conveyor, second drive means operably contacting connecting said conveyor belt and connected to said brush for rotating the brush about its axis, and shifting means responsive to the unit reaching a predetermined location in its reciprocating path of travel for pivoting said plow means and said brush means from the first position to the second position to thereby discharge feed from the opposite side edge of the belt, said shifting means being disposed adjacent said feed supply means and being operable after reversal of the direction of travel of said unit.

9. The apparatus of claim 8, wherein said second drive means comprises a rotatable member disposed in engagement with the upper run of said belt, and a flexible drive member operably connecting said rotatable member to said brush.

10. The apparatus of claim 8, wherein said blade in said first and second positions is disposed at an angle of approximately 55° with respect to a line transverse to the side edge of the belt and said brush when in said first and second positions extends at an angle of about 45° with respect to said line.

11. The apparatus of claim 8, and including an actuating member connected to said plow means and said brush means and movable with respect to said frame from an operable to an inoperable position, a trip member pivotally mounted on said supporting structure and being freely pivotable in a direction toward the feed end of said conveyor and being restrained against pivotal movement in the opposite direction, movement of said unit in a direction toward said feed end causing said actuating member to pivot the trip member to thereby enable said actuating member to ride by said trip member, movement of said unit in the opposite direction moving said actuating member into engagement with said trip member to cause said actuating member to pivot relative to said frame and thereby pivot said brush means and said plow means from said first position to said second position.

12. The apparatus of claim 8, and including actuating means connected to said plow means and said brush means, said actuating means including a pair of arms pivotally mounted with respect to said frame, said apparatus also including trip means disposed on said supporting structure to selectively engage one of said arms and pivot said plow means and said brush means from the first to second position.

13. The apparatus of claim 12, wherein a first of said arms has an operable position extending outwardly of said unit and an inoperative position, and the second of said arms has an operable position extending outwardly of said unit and has an inoperative position, said trip means comprising a trip lever disposed at each side of the conveyor and disposed to engage the respective arm to pivot said plow means and said brush means.

14. The apparatus of claim 13, wherein each trip lever is freely pivotable in a direction toward said feed end of the conveyor and is restrained against pivotal movement in the opposite direction, each trip lever being freely pivoted by the respective arm in the direction toward said feed end as said unit moves toward the end point in its reciprocating path of tavel, reverse travel of said unit in a direction away from said feed end causing said lever to pivot the respective arm to thereby pivot said plow means and said brush means.

15. A livestock feeding apparatus, comprising a supporting structure, an endless conveyor belt mounted for travel on said supporting structure and having an upper conveying run and a lower run, feed supply means for supplying feed to one end of the upper run of the belt, a feed discharge unit disposed above said upper run for selectively discharging feed from either side edge of said belt, said unit including a frame, plow means carried by the frame and having a blade disposed to ride against the upper run of said belt, brush means carried by the frame and including a rotatable brush, said brush having its axis disposed generally horizontal and disposed generally parallel to said blade, pivot means for pivoting said plow means and said brush means from a first position whereat said blade and said brush extend diagonally at an acute angle to a side edge of the belt to a second position in which said blade and said brush extend diagonally at a second acute angle to the side edge of the belt, first drive means for moving said unit in a reciprocating path along the length of the conveyor, second drive means operably contacts said conveyor belt and connecting to said brush for rotating the brush about its axis, an actuating member operably connected to said plow means and said brush means and pivotally mounted for movement between an operable position and an inoperable position with respect to said frame, a trip member pivotally mounted on said supporting structure and freely pivotable in a direction toward the feed end of said conveyor and being restrained against pivotal movement in the opposite direction, movement of said unit in a direction toward said feed end causing said actuating member, when in the operative position, to engage said trip member and enable said actuating member to ride past said trip member, movement of said unit in the opposite direction causing said actuating member to engage said trip member to thereby pivot said actuating member and move said plow means and said blade means from the first position to the second position.

16. The apparatus of claim 15, and including mounting means for mounting said plow means for floating vertical movement relative to said frame to permit said plow means to maintain contact with the upper run of said belt.

* * * * *

UNITED STATES PATENT AND TRADEMARK OFFICE
CERTIFICATE OF CORRECTION

PATENT NO. : 4,576,117

DATED : March 18, 1986

INVENTOR(S) : Gary L. Garber et al

It is certified that error appears in the above-identified patent and that said Letters Patent is hereby corrected as shown below:

Column 7, line 61, delete "contacting"; Column 9, line 10, "contacts" should read -- contacting --; Column 9, line 11, "connecting" should read -- connected --.

Signed and Sealed this

Fifth Day of August 1986

[SEAL]

Attest:

DONALD J. QUIGG

Attesting Officer

Commissioner of Patents and Trademarks